US008570658B2

(12) United States Patent
Nibauer et al.

(10) Patent No.: US 8,570,658 B2
(45) Date of Patent: Oct. 29, 2013

(54) NON POWERED CONCEPTS FOR A WIRE FRAME OF FLUID FILLED LENSES

(75) Inventors: Lisa Nibauer, Short Hills, NJ (US); Matthew Wallace Peterson, San Francisco, CA (US); Daniel Senatore, San Francisco, CA (US); Urban Schnell, Munchenbuchsee (CH); Karim Haroud, Chavannes sur Moudon (CH)

(73) Assignee: Adlens Beacon, Inc., Pembroke Park, FL (US)

( * ) Notice: Subject to any disclaimer, the term of this patent is extended or adjusted under 35 U.S.C. 154(b) by 112 days.

(21) Appl. No.: 13/270,905

(22) Filed: Oct. 11, 2011

(65) Prior Publication Data

US 2012/0087014 A1   Apr. 12, 2012

Related U.S. Application Data

(60) Provisional application No. 61/391,827, filed on Oct. 11, 2010.

(51) Int. Cl.
| *G02B 3/14* | (2006.01) |
| *G02C 7/06* | (2006.01) |
| *G02C 5/14* | (2006.01) |

(52) U.S. Cl.
CPC *G02B 3/14* (2013.01); *G02C 7/063* (2013.01); *G02C 5/143* (2013.01)
USPC ................... 359/665; 351/159.68; 351/111

(58) Field of Classification Search
USPC ............................ 359/665, 666; 351/159.68
See application file for complete search history.

(56) References Cited

U.S. PATENT DOCUMENTS

| 2,576,581 | A | * | 11/1951 | Edwards ..................... 351/41 |
| 2,836,101 | A | | 5/1958 | Swart |
| 2,976,766 | A | | 3/1961 | Bianchi |
| 3,598,479 | A | | 8/1971 | Wright |

(Continued)

FOREIGN PATENT DOCUMENTS

| WO | WO 2008/063442 A1 | 5/2008 |
| WO | WO 2011/047305 A1 | 4/2011 |

OTHER PUBLICATIONS

Borish, I.M., *Clinical Refraction*, 3rd Edition, Chapter 26 (pp. 1051-1113), The Professional Press, Inc., Chicago (1970), 65 pages.

(Continued)

*Primary Examiner* — Scott J Sugarman
*Assistant Examiner* — William Alexander
(74) *Attorney, Agent, or Firm* — Sterne, Kessler, Goldstein & Fox P.L.L.C.

(57) ABSTRACT

Various embodiments of a non-powered actuator arm for controlling liquid flow to a fluid-filled lens are described herein. A vertical tweezer assembly compresses a reservoir of solution in a first vertical direction by lateral disposition of a slider mounted on the outside of the housing. The assembly may also be shaped to provide compression of the reservoir in a second horizontal direction by lateral disposition of a slider. In another embodiment, a housing may contain a piston that moves laterally within the housing and collapses the reservoir disposed adjacent to the piston and also within the housing. The housing may contain a plurality of compressible domes which can each be compressed to cause a local compression on the reservoir disposed within the housing. Compression of the reservoir causes liquid inflation of a lens module.

32 Claims, 10 Drawing Sheets

(56) References Cited

U.S. PATENT DOCUMENTS

| | | |
|---|---|---|
| 3,614,215 A | 10/1971 | Mackta |
| 4,181,408 A * | 1/1980 | Senders ................... 351/159.68 |
| 4,477,158 A | 10/1984 | Pollock et al. |
| 4,890,903 A | 1/1990 | Treisman et al. |
| 4,913,536 A | 4/1990 | Barnea |
| 5,080,476 A | 1/1992 | Monin |
| 5,138,494 A | 8/1992 | Kurtin |
| 5,182,585 A | 1/1993 | Stoner |
| 5,229,885 A | 7/1993 | Quaglia |
| 5,371,629 A | 12/1994 | Kurtin et al. |
| 5,440,357 A | 8/1995 | Quaglia |
| 5,515,203 A | 5/1996 | Nye |
| 5,563,528 A | 10/1996 | Diba et al. |
| 5,574,598 A | 11/1996 | Koumura et al. |
| 5,636,368 A | 6/1997 | Harrison et al. |
| 5,668,620 A | 9/1997 | Kurtin et al. |
| 5,684,637 A | 11/1997 | Floyd |
| 5,719,397 A | 2/1998 | Hallett et al. |
| 5,731,909 A | 3/1998 | Schachar |
| 5,739,959 A | 4/1998 | Quaglia |
| 5,774,273 A | 6/1998 | Bornhorst |
| 5,790,882 A | 8/1998 | Silver et al. |
| 5,844,340 A | 12/1998 | Noda |
| 5,900,921 A | 5/1999 | Min |
| 5,944,495 A | 8/1999 | Jacobsen et al. |
| 5,952,846 A | 9/1999 | Silver |
| 5,956,183 A | 9/1999 | Epstein et al. |
| 5,963,048 A | 10/1999 | Harrison et al. |
| 5,973,852 A | 10/1999 | Task |
| 5,999,328 A | 12/1999 | Kurtin et al. |
| 6,040,947 A | 3/2000 | Kurtin et al. |
| 6,053,610 A | 4/2000 | Kurtin et al. |
| 6,069,742 A | 5/2000 | Silver |
| 6,091,892 A | 7/2000 | Xue et al. |
| 6,188,525 B1 | 2/2001 | Silver |
| 6,246,528 B1 | 6/2001 | Schachar |
| 6,493,151 B2 | 12/2002 | Schachar |
| 6,552,860 B1 | 4/2003 | Alden |
| 6,618,208 B1 | 9/2003 | Silver |
| 6,626,532 B1 | 9/2003 | Nishioka et al. |
| 6,715,876 B2 | 4/2004 | Floyd |
| 6,836,374 B2 | 12/2004 | Esch et al. |
| 6,930,838 B2 | 8/2005 | Schachar |
| 6,992,843 B2 | 1/2006 | Juhala |
| 7,068,439 B2 | 6/2006 | Esch et al. |
| 7,085,065 B2 | 8/2006 | Silver |
| 7,142,369 B2 | 11/2006 | Wu et al. |
| 7,256,943 B1 | 8/2007 | Kobrin et al. |
| 7,261,736 B1 | 8/2007 | Azar |
| 7,324,287 B1 | 1/2008 | Gollier |
| 7,325,922 B2 | 2/2008 | Spivey |
| 7,338,159 B2 | 3/2008 | Spivey |
| 7,342,733 B2 | 3/2008 | Takei |
| 7,369,321 B1 | 5/2008 | Ren et al. |
| 7,382,544 B2 | 6/2008 | Cernasov |
| 7,423,811 B2 | 9/2008 | Silver |
| 7,440,193 B2 | 10/2008 | Gunasekaran et al. |
| 7,453,646 B2 | 11/2008 | Lo |
| 7,475,985 B2 | 1/2009 | Blum et al. |
| 7,580,195 B2 | 8/2009 | Choi et al. |
| 7,580,197 B2 | 8/2009 | Omura et al. |
| 7,594,726 B2 | 9/2009 | Silver |
| 7,604,349 B2 | 10/2009 | Blum et al. |
| 2004/0240076 A1 | 12/2004 | Silver |
| 2005/0140922 A1 | 6/2005 | Bekerman et al. |
| 2005/0143814 A1 | 6/2005 | Esch et al. |
| 2006/0066808 A1 | 3/2006 | Blum et al. |
| 2006/0077562 A1 | 4/2006 | Silver |
| 2006/0164731 A1 | 7/2006 | Wu et al. |
| 2006/0245071 A1 | 11/2006 | George et al. |
| 2006/0250699 A1 | 11/2006 | Silver |
| 2007/0030573 A1 | 2/2007 | Batchko et al. |
| 2007/0211207 A1 | 9/2007 | Lo et al. |
| 2008/0002150 A1 | 1/2008 | Blum et al. |
| 2008/0007689 A1 | 1/2008 | Silver |
| 2008/0008600 A1 | 1/2008 | Silver |
| 2008/0019015 A1 | 1/2008 | Fernandez et al. |
| 2008/0084532 A1 | 4/2008 | Kurtin |
| 2008/0112059 A1 | 5/2008 | Choi et al. |
| 2008/0218873 A1 | 9/2008 | Batchko et al. |
| 2008/0231963 A1 | 9/2008 | Batchko et al. |
| 2008/0285143 A1 | 11/2008 | Batchko et al. |
| 2008/0316587 A1 | 12/2008 | Tijburg et al. |
| 2009/0021843 A1 | 1/2009 | Obrebski et al. |
| 2009/0052409 A1 | 2/2009 | Chen et al. |
| 2009/0086331 A1 | 4/2009 | Gunasekaran et al. |
| 2009/0116118 A1 | 5/2009 | Frazier et al. |
| 2009/0128922 A1 | 5/2009 | Justis et al. |
| 2009/0195882 A1 | 8/2009 | Bolle et al. |
| 2009/0213471 A1 | 8/2009 | Silver et al. |
| 2009/0251792 A1 | 10/2009 | Suzuki et al. |
| 2009/0267383 A1 | 10/2009 | Fischer et al. |
| 2010/0045930 A1 | 2/2010 | Silver et al. |
| 2010/0053543 A1 | 3/2010 | Silver et al. |
| 2010/0154180 A1 | 6/2010 | Kasai |
| 2010/0208194 A1 | 8/2010 | Gupta et al. |
| 2010/0208195 A1 | 8/2010 | Gupta et al. |

OTHER PUBLICATIONS

Jalie, M., *The Principles of Ophthalmic Lenses*, 4th Edition, Chapter 18 (pp. 413-468), The Association of Dispensing Opticians, Hazell Watson & Viney Limited, London (1981), 58 pages.

Markoff, J., "Scientists At Work: Stephen Kurtin—Making Eyeglasses That Let Wearers Change Focus on the Fly," *The New York Times*, 3 pages (Aug. 4, 2009).

Tang, S.K.Y, et al., "Dynamically Reconfigurable Liquid-Core Liquid-Cladding Lens in a Microfluidic Channel," *Lab on a Chip*, vol. 8, No. 3, p. 395-401 (Mar. 2008), 8 pages.

International Search Report and Written Opinion, dated Dec. 10, 2010, for PCT Appl. No. PCT/US2010/052902, 12 pages.

Gupta, A. et al., U.S. Appl. No. 12/904,736, filed Oct. 14, 2010, entitled "Fluid Filled Lens Reservoir System and Manufacturing Method of Reservoir System,".

Senatore, D. et al., U.S. Appl. No. 12/904,769, filed Oct. 14, 2010, entitled "Hinge Mechanism for a Fluid Filled Lens Assembly,".

Senatore, D. et al., U.S. Appl. No. 13/000,887, filed Dec. 22, 2010, entitled "Fluid Filled Lenses and Mechanisms of Inflation Thereof,".

International Search Report and Written Opinion, dated Mar. 7, 2012, for PCT Appl. No. PCT/US 11/55707, 14 pages.

Nibauer, L. et al., U.S. Appl. No. 13/270,910, filed Oct. 11, 2011 entitled "Perimeter Piezo Reservoir in a Lens".

* cited by examiner

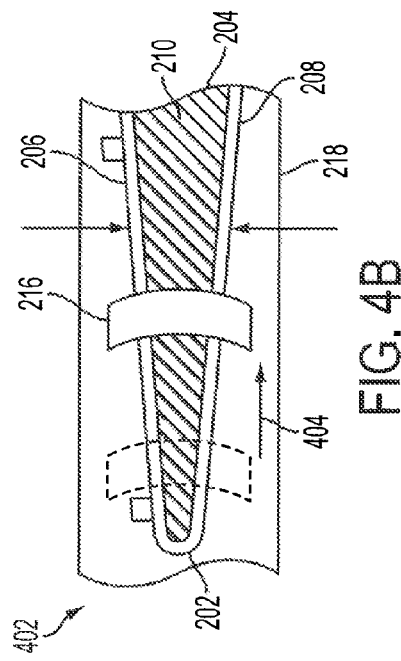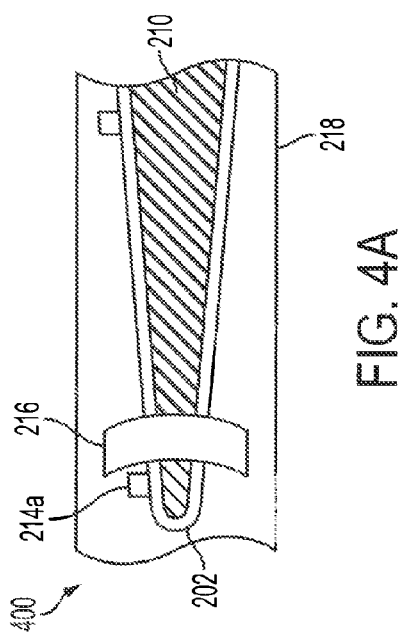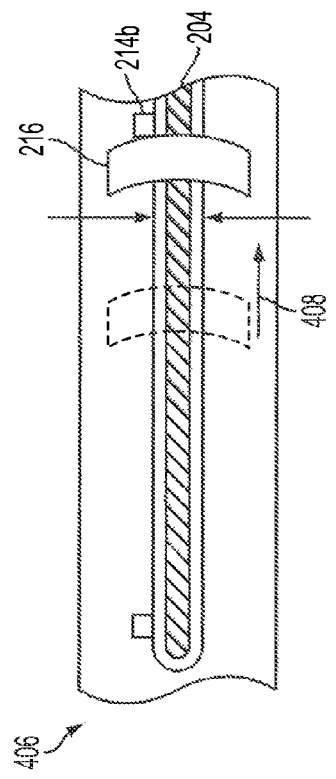

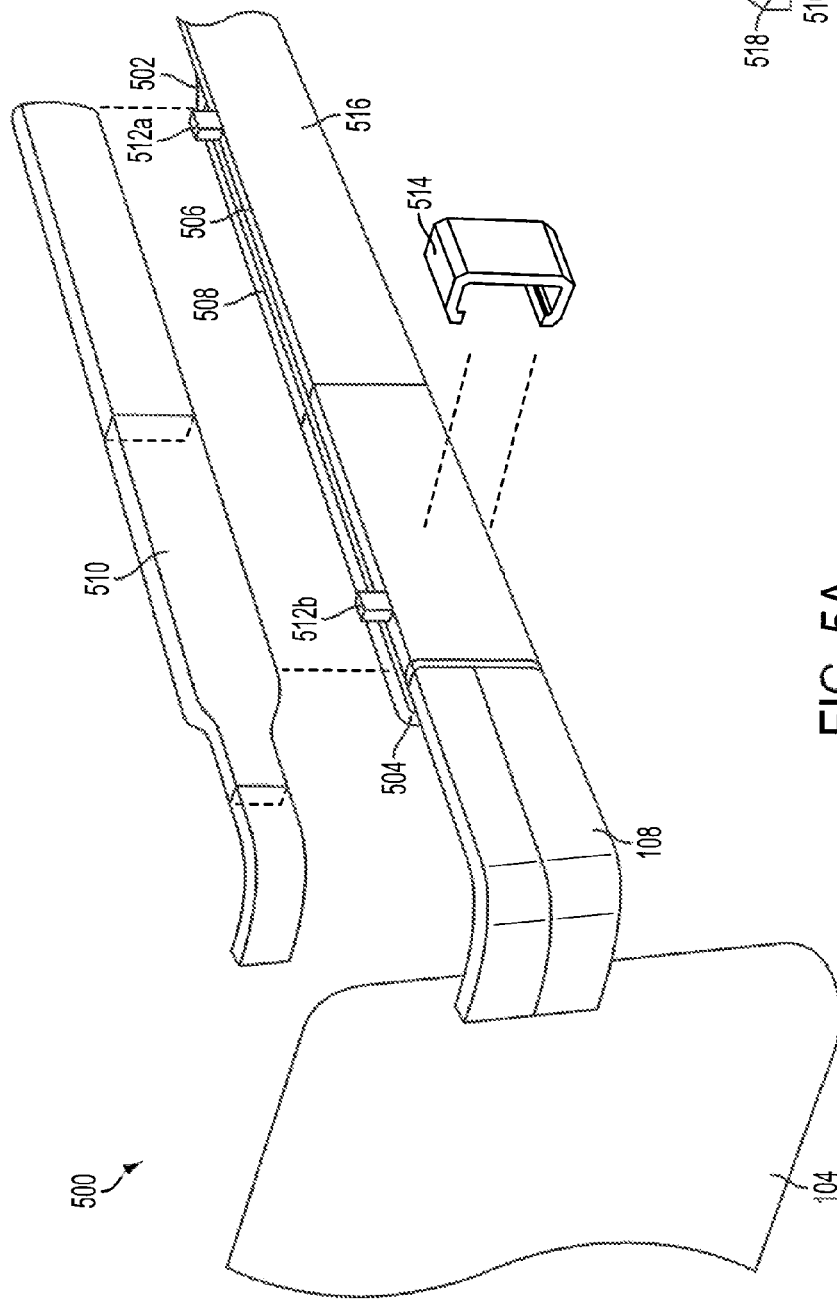
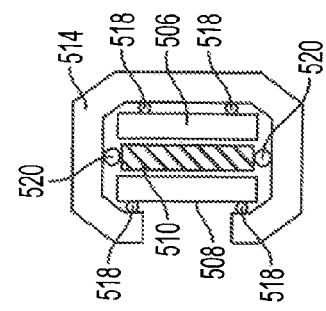
FIG. 5A
FIG. 5B

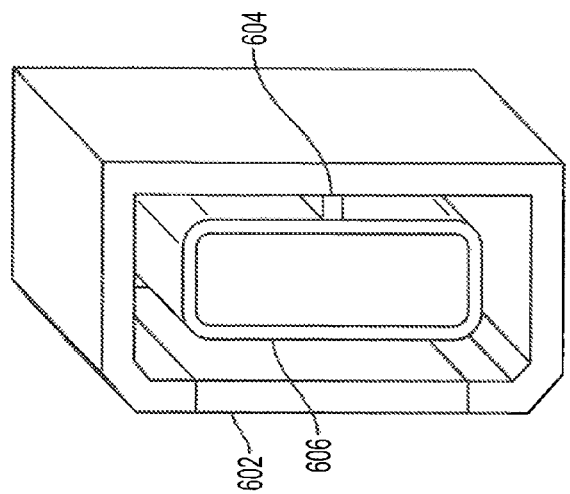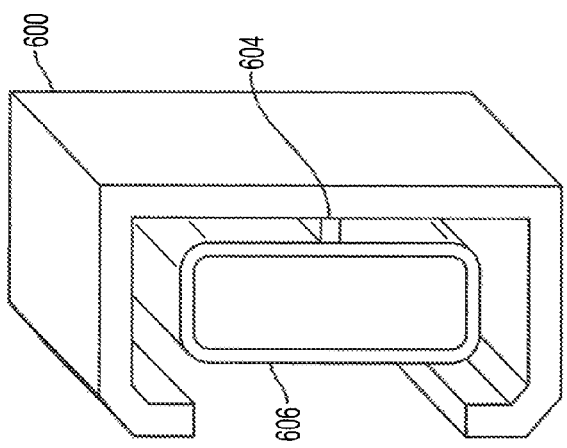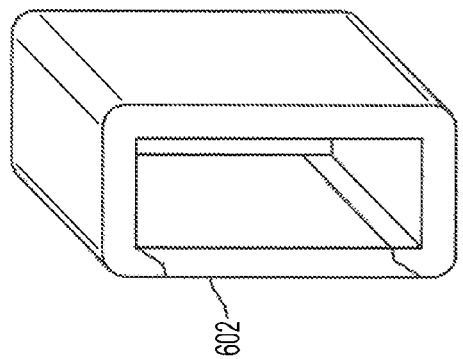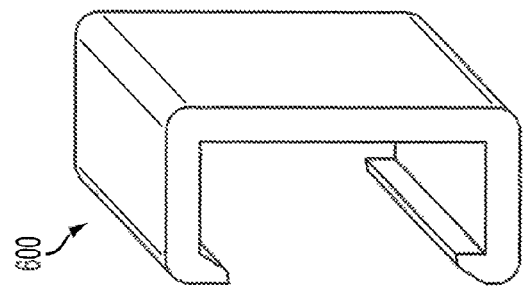

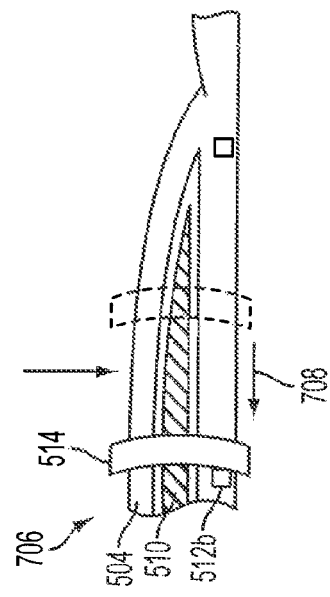

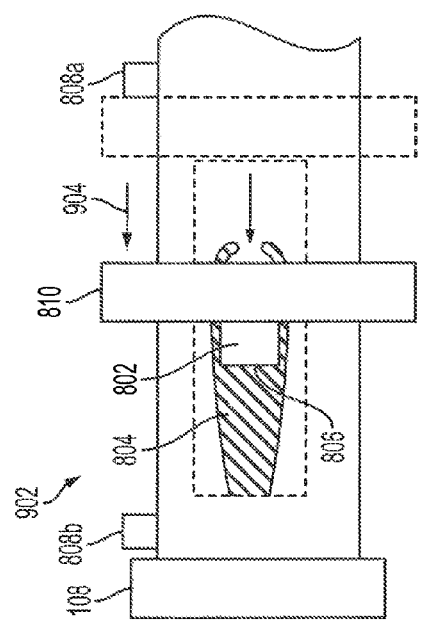
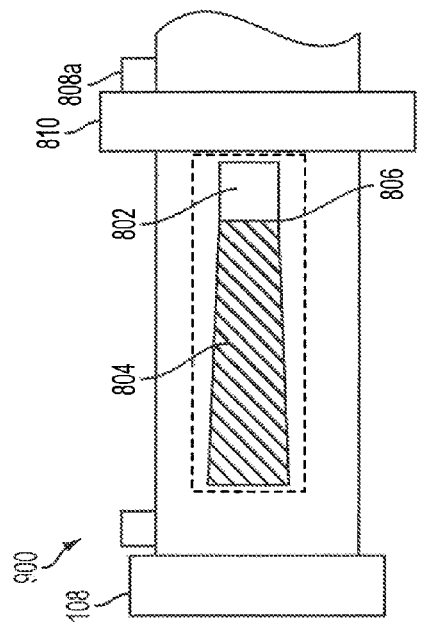
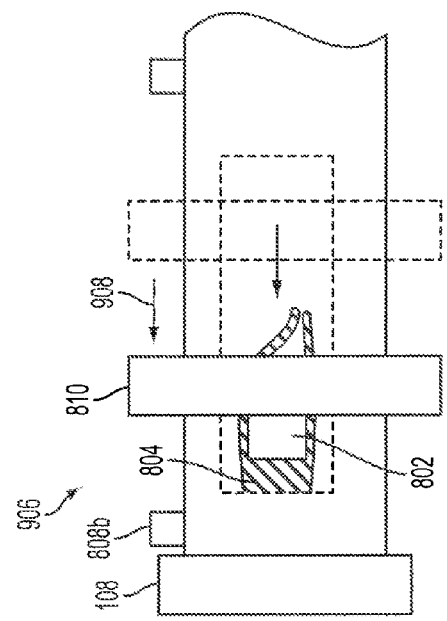

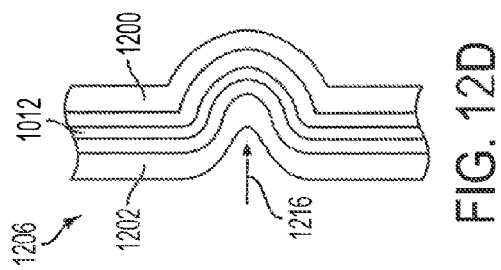
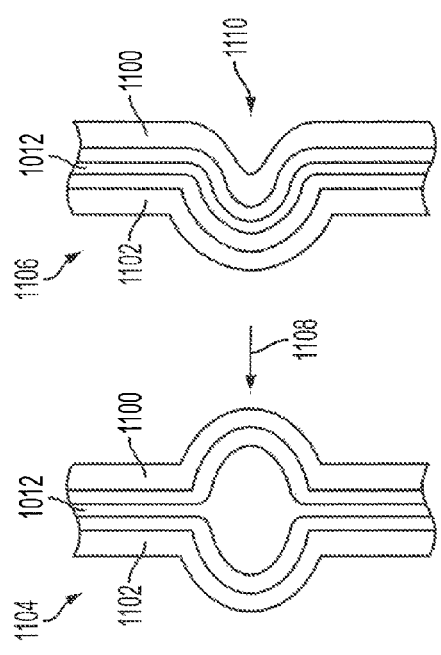
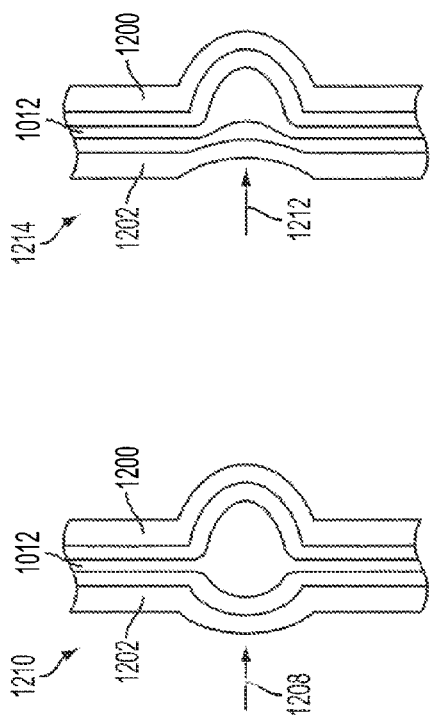
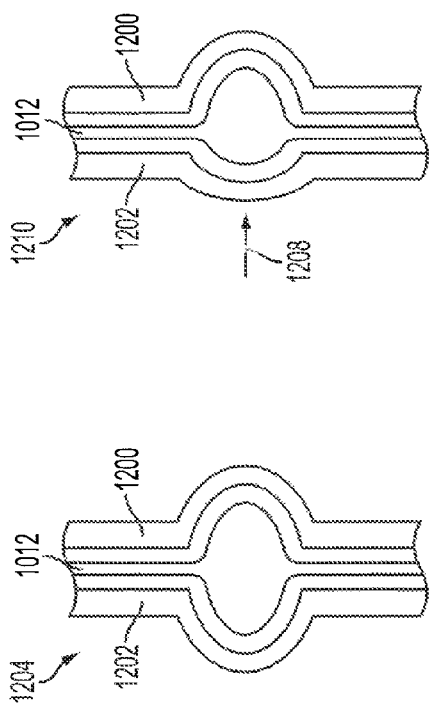

ved herein by reference in its entirety. More recent examples may be found

NON POWERED CONCEPTS FOR A WIRE FRAME OF FLUID FILLED LENSES

CROSS REFERENCE TO RELATED APPLICATIONS

This application claims priority to U.S. Provisional Patent Application No. 61/391,827 filed Oct. 11, 2010, which is incorporated herein by reference in its entirety.

BACKGROUND

1. Field

Embodiments of the present invention relate to fluid-filled lenses and in particular to variable fluid-filled lenses.

2. Background

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). In all cases, the advantages of fluid lenses, such as a wide dynamic range, ability to provide adaptive correction, robustness, and low cost have to be balanced against limitations in aperture size, possibility of leakage, and consistency in performance. The '065 patent, for example, has disclosed several improvements and embodiments directed towards effective containment of the fluid in the fluid lens to be used in ophthalmic applications. Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

BRIEF SUMMARY

In an embodiment, an actuator for a sealed fluid filled lens includes a tweezer assembly including a fixed end, a free end, a top pincer, and a bottom pincer. A reservoir is disposed within the tweezer assembly, wherein the reservoir is in fluid communication with the fluid filled lens. The reservoir is placed parallel to the length of the tweezer assembly between the fixed end and the free end such that flexing the tweezer assembly compresses the reservoir along a length of the reservoir. A slider is laterally moveable along an outer surface of the tweezer assembly, wherein, movement of the slider from one end of the tweezer assembly to the other end flexes the tweezer assembly.

In another embodiment, an actuator for a sealed fluid filled lens includes a housing and a reservoir. The reservoir is disposed within the housing and placed parallel to the length of the housing. A piston is placed inside the housing and is attached to an end of the reservoir, wherein lateral movement of the piston from a first end of the housing to a second end of the housing collapses the reservoir onto itself. A slider moves laterally along an outer surface of the housing, wherein the movement of the slider from the first end of the housing to the second end of the housing pushes the piston, causing the reservoir to collapse onto itself.

In another embodiment, an actuator for a sealed fluid filled lens includes a housing and a plurality of domes placed along the outer surface of the housing. The housing includes an inner half and an outer half. The plurality of domes includes a plurality of meta-stable domes placed along the outer surface of the inner half of the housing and a plurality of bi-stable domes placed along the outer surface of the outer half of the housing, wherein each bi-stable dome is placed directly across from a respective meta-stable dome. The actuator further includes a reservoir disposed within the housing between the plurality of meta-stable domes and the plurality of bi-stable domes, wherein the reservoir is in fluid communication with the fluid filled lens.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

FIG. 2b illustrates a cross-section view of the vertical tweezer actuator of FIG. 2a.

FIG. 4a illustrates a side view of a slider in a first position on the vertical tweezer actuator, according to an embodiment.

FIG. 4b illustrates a side view of a slider in a second position on the vertical tweezer actuator, according to an embodiment.

FIG. 4c illustrates a side view of a slider in a third position on the vertical tweezer actuator, according to an embodiment.

FIG. 5a illustrates a perspective view of an exemplary horizontal tweezer actuator.

FIG. 5b illustrates a cross-section view of the horizontal tweezer actuator of FIG. 5a.

FIG. 6a-d illustrate perspective views of embodiments of an exemplary slider.

FIG. 7a illustrates a top-down view of a slider in a first position on the horizontal tweezer actuator, according to an embodiment.

FIG. 7b illustrates a top-down view of a slider in a second position on the horizontal tweezer actuator, according to an embodiment.

FIG. 7c illustrates a top-down view of a slider in a third position on the horizontal tweezer actuator, according to an embodiment.

Figure 8:
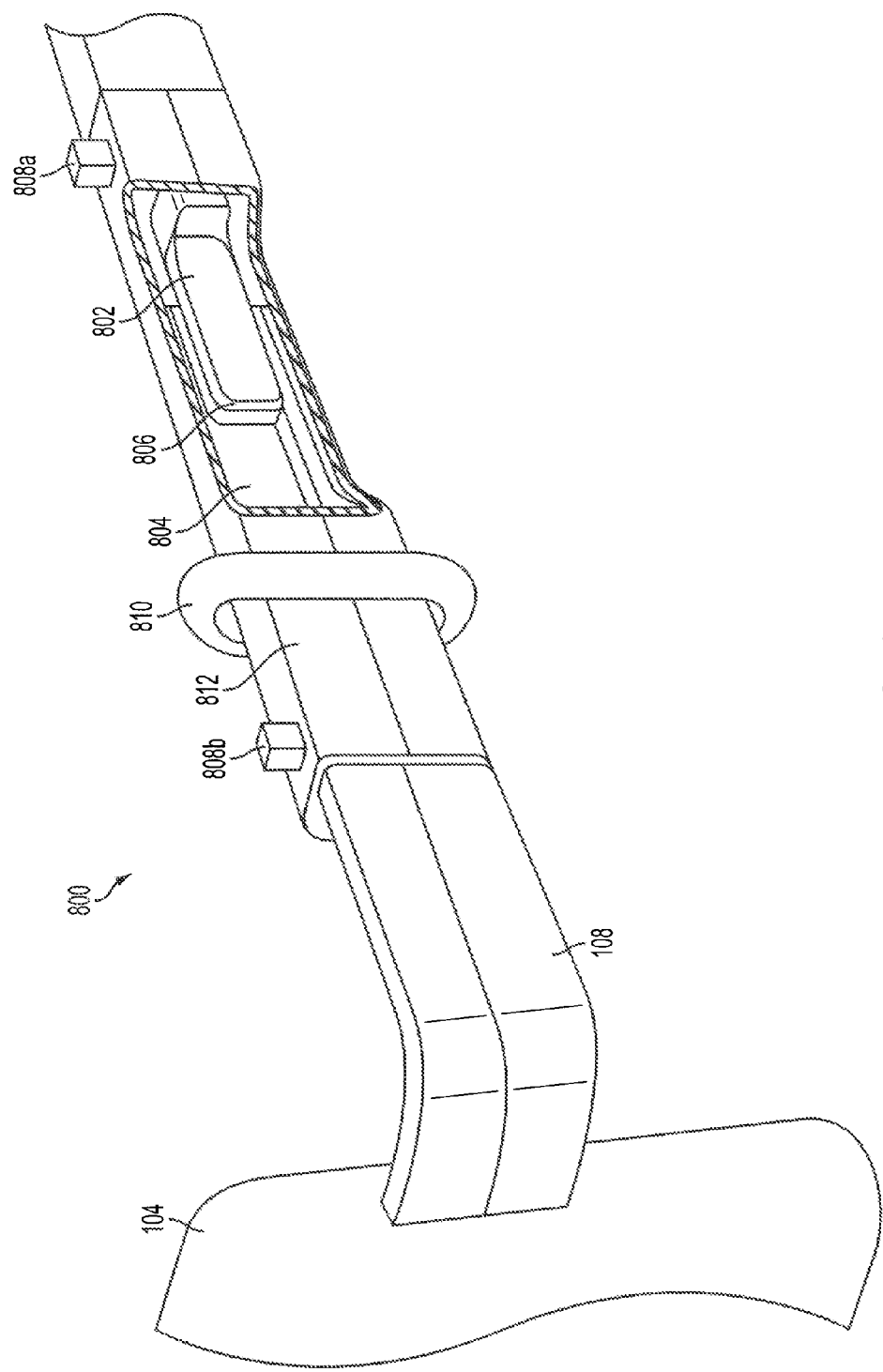

FIG. 8 illustrates a perspective cut-away view of an exemplary piston-driven actuator.

FIG. 9a illustrates a side cut-away view of a slider in a first position on the piston-driven actuator, according to an embodiment.

FIG. 9b illustrates a side cut-away view of a slider in a second position on the piston-driven actuator, according to an embodiment.

FIG. 9c illustrates a side cut-away view of a slider in a third position on the piston-driven actuator, according to an embodiment.

Figure 10:
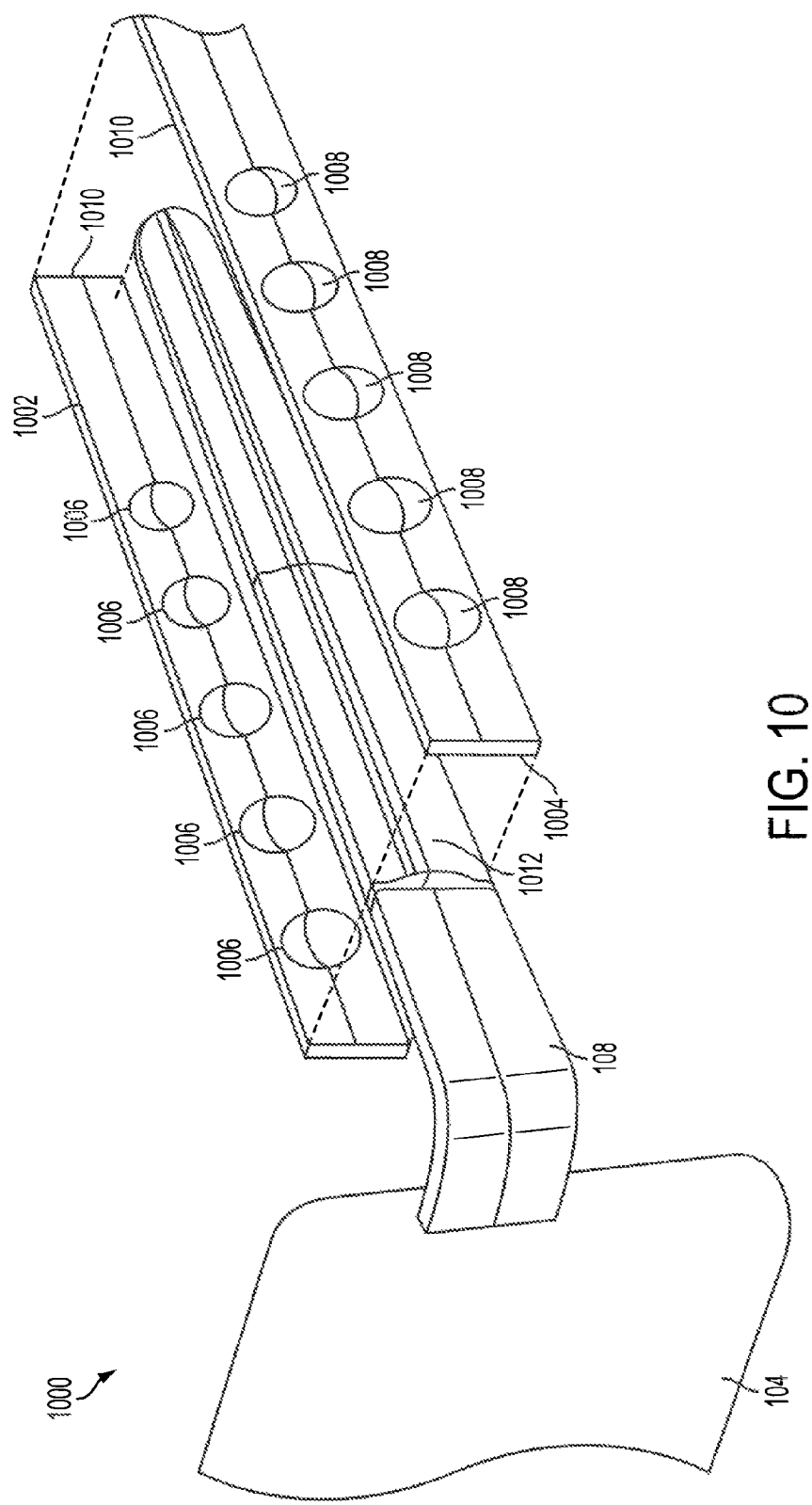

FIG. 10 illustrates an exploded perspective view of an exemplary sandwich dome actuator.

FIG. 11 illustrates a cross-section demonstrating the actuation principle of a bi-stable dome, according to an embodiment.

FIG. 12a-d illustrate cross-sections demonstrating the actuation principle of a meta-stable dome, according to an embodiment.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Fluid lenses have important advantages over conventional means of vision correction, such as rigid lenses and contact lenses. First, fluid lenses are easily adjustable. Thus, a presbyope who requires an additional positive power correction to view near objects can be fitted with a fluid lens of base power matching the distance prescription. The user can then adjust the fluid lens to obtain additional positive power correction as needed to view objects at intermediate and other distances.

Second, fluid lenses can be adjusted continuously over a desired power range by the wearer. As a result, the wearer can adjust the power to precisely match the refractive error for a particular object distance in a particular light environment. Thus, fluid lenses allow adjustment of power to compensate for alteration of the natural depth of focus of the eye that depends on the wearer's pupil size, which is in turn dependent on the ambient light level.

Third, although 20/20 vision, which corresponds to an image resolution of 1 minute of arc (1/60 degree) is generally acknowledged to represent an acceptable quality of vision, the human retina is capable of finer image resolution. It is known that a healthy human retina is capable of resolving 20 seconds of arc (1/300 degree). Corrective eyeglasses designed to enable a patient to achieve this superior level of vision have a resolution of about 0.10 D or better. This resolution can be achieved with continuously adjustable fluid lens elements.

In an embodiment of a fluid lens assembly, one or more fluid lenses may be provided with its own actuation system, so that a lens for each eye can be adjusted independently. This feature allows wearers, such as anisometropic patients, to correct any refractive error in each eye separately, so as to achieve appropriate correction in both eyes, which can result in better binocular vision and binocular summation.

Figure 1:
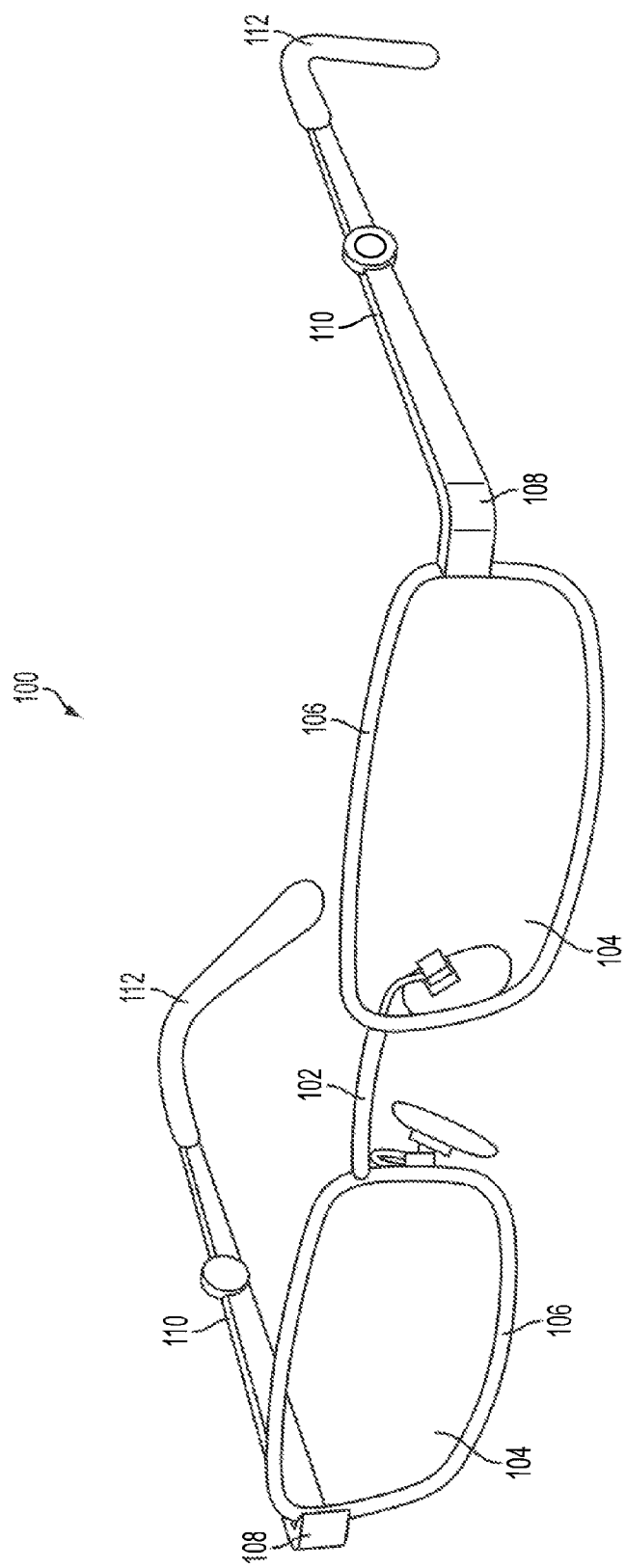
FIG. 1 illustrates a perspective view of an embodiment of a fluid filled lens system.

FIG. 1 illustrates a perspective view of a fluid filled lens system 100 according to an embodiment of the present invention. The fluid filled lens system 100 includes: a bridge 102, left and right lens module 104, left and right hinge 108, left and right actuator arm 110, and left and right distal end 112 of actuator arms 110. It should be appreciated that all descriptions of each component listed apply to both the left and right versions of each component in the system. Hinge 108 connects lens module 104 to actuator arm 110. Actuator arm 110 operates to compress a reservoir (not shown) and transfer fluid between the reservoir and lens module 104. Distal end 112 of actuator arm 110 is shaped to fit over the wearer's ear.

In an embodiment, lens module 104 further comprises a rim 106 which defines the edge of lens module 104. Lens module 104 may further include a flexible back surface provided by, for example, a flexible membrane (not shown) stretched flat over the edge of a rigid optical lens. To change the optical power of lens module 104, the membrane may be inflated through the addition of fluid from a reservoir (not shown). The reservoir is placed within actuator arm 110 and is attached to lens module 104 via a connecting tube (not shown) placed within hinge 108. The connecting tube is designed to be impermeable to the fluid contained therein. In an embodiment, the overall assembly including lens module 104, the connecting tube, and the reservoir is designed to maintain a seal excluding fluids and air for an overall use period of two years or more. In an embodiment, the connecting tube is thin in order to be accommodated within a hinge cavity. In an embodiment, the connecting tube is less than 2.0 mm in outer diameter and less than 0.50 mm in wall thickness, in order to maintain an adequate flow of fluid. In an embodiment, the connecting tube is capable of being bent by an angle of no less than 60 degrees. In an embodiment, the connecting tube is capable of being bent by an angle of no less than 45 degrees without crimping. In an embodiment, the connecting tube is durable to repeated flexing of the hinge.

Designs of actuator arm 110, and methods of compressing the reservoir and changing the optical power of lens module 104 are described herein.

Figure 2A:
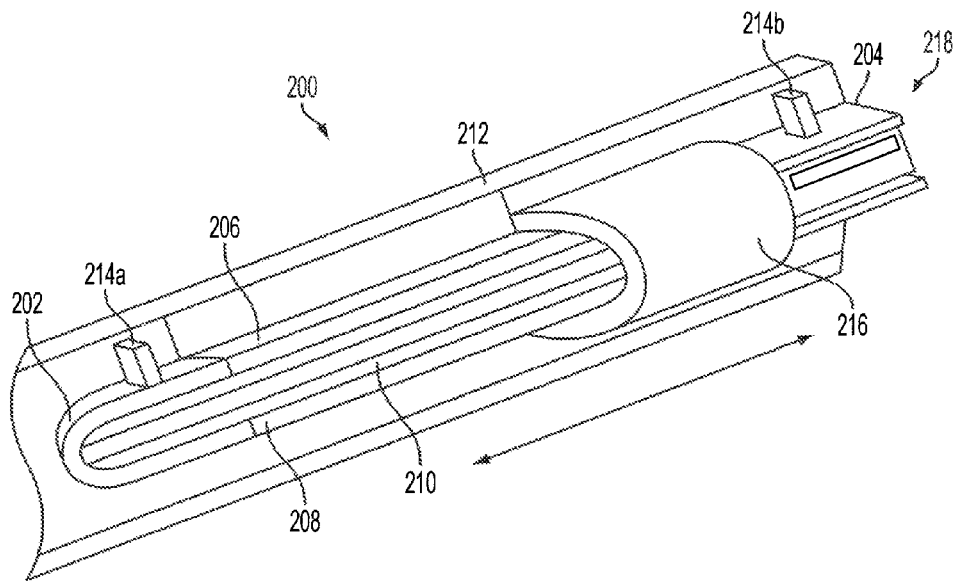
FIG. 2a illustrates a perspective view of an exemplary vertical tweezer actuator.

FIG. 2a illustrates a perspective view of an embodiment of actuator arm 110. In this embodiment, a vertical tweezer actuator 200 includes a tweezer assembly 218 with a fixed end 202, a free end 204, a top pincer 206, and a bottom pincer 208. A reservoir 210 is disposed between the top and bottom pincers. Vertical tweezer actuator 200 further includes a brace 212, mechanical stops 214a and 214b, and a slider 216. In an embodiment, slider 216 fits over top pincer 206 and bottom pincer 208 and can slide laterally along the length of tweezer assembly 218 between two mechanical stops 214a and 214b. In an embodiment, slider 216 can move laterally along the inner side of tweezer assembly 218 as illustrated in FIG. 2a. The inner side is understood to be the side facing towards the wearer's head.

Figure 2B:
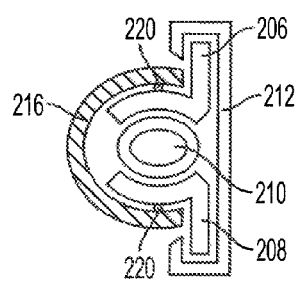

FIG. 2b provides a cross-section view of vertical tweezer actuator 200. FIG. 2b also provides a view of ball bearings 220 placed between slider 216 and both top pincer 206 and bottom pincer 208. Ball bearings 220 provide low friction contact between slider 216 and the rest of the assembly. Other bearing designs may be utilized for the movement of the slider, for example, roller sliders, plain bearings or dovetail bearings. FIG. 2b also provides an exemplary view of brace 212 which provides support for top pincer 206 and bottom pincer 208. Although FIG. 2b shows top pincer 206 and bottom pincer 208 with a curved shape, other shapes may also be used, e.g. a flat shape to cause further compression on reservoir 210.

Figure 3:
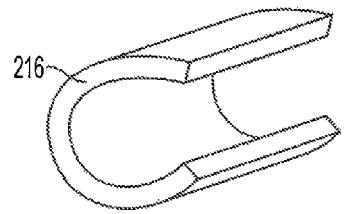
FIG. 3 illustrates a perspective view of an embodiment of an exemplary slider.

FIG. 3 illustrates a perspective view of slider 216 removed from the rest of the assembly. In an embodiment, slider 216 has a rounded cuff shape. Other shapes for slider 216 may also be used, e.g. a bracket shape.

FIG. 4a illustrates a side view of the vertical tweezer actuator 400 with slider 216 in a first position against mechanical stop 214a. FIG. 4b illustrates the vertical tweezer actuator 402 with a lateral movement 404 of slider 216 along the inner side of the tweezer assembly 218 to a second position between fixed end 202 and free end 204 of the tweezer assembly 218. The movement causes top pincer 206 and bottom pincer 208 to flex toward each other and compress reservoir 210. FIG. 4c illustrates the vertical tweezer actuator 406 with a lateral movement 408 of slider 216 along the inner side of the tweezer assembly 218 to a third position against mechanical stop 214b. The movement to the third slider position causes further compression of reservoir 210 to a maximal state of compression. In an embodiment, as slider 216 is moved away from free end 204 towards fixed end 202 laterally along the inner side of the tweezer assembly 218, the compressing force on reservoir 210 is released, and reservoir 210 springs back to its original shape, temporarily causing low pressure on the fluid, and thus pulling fluid back from lens module 104.

FIG. 5a illustrates a perspective view of an embodiment of actuator arm 110. In this embodiment, a horizontal tweezer actuator 500 includes a tweezer assembly 516 with a fixed end 502, a free end 504, a fixed pincer 506, and a free pincer 508. A reservoir 510 is disposed between fixed pincer 506 and free pincer 508. Vertical tweezer actuator 500 further includes mechanical stops 512a and 512b, and a slider 514. In an embodiment, slider 514 fits around fixed pincer 506 and free pincer 508 and can slide laterally along the length of tweezer assembly 516 between mechanical stops 512a and 512b.

In an embodiment, both fixed pincer 506 and free pincer 508 may be of any shape or size. In an example, fixed pincer 506 may have a bracket shape that is larger than a bracket shape of free pincer 508.

FIG. 5b provides a cross-section view of horizontal tweezer actuator 500. Ball bearings 518 are placed between slider 514 and either one or both pincers. Ball bearings 518 provide low friction contact between slider 514 and the outer surface of tweezer assembly 516. In an embodiment, ball bearings 520 may also be included to provide a rolling contact between slider 514 and reservoir 510. Ball bearings 520 require a higher force to overcome static friction than ball bearings 518 and will prevent slider 514 from unwanted movement. Other bearing designs may be utilized for the movement of slider 514, for example, roller sliders, plain bearings or dovetail bearings.

FIG. 6a-d illustrate embodiments of slider designs for use with horizontal tweezer actuator 500. FIG. 6a illustrates a perspective view of an open bracket slider 600. FIG. 6b illustrates a perspective view of a closed bracket slider 602. FIG. 6c illustrates a perspective view of open bracket slider 600 further showing a connector 604 and a sliding loop 606. Sliding loop 606 fits more closely around tweezer assembly 518 than either open bracket slider 600 or closed bracket slider 602. Connector 604 attaches sliding loop 606 to open bracket slider 600. In an embodiment, slider loop 606 uses ball bearings (not shown) to make contact to either one or both pincers or reservoir 510 as discussed previously. The inclusion of slider loop 606 provides a more constant force acting upon the pincers as slider 600 is disposed along the length of tweezer assembly 516. FIG. 6d illustrates sliding loop 606 and connector 604 as described above within closed bracket slider 602.

FIG. 7a illustrates a top-down view of the horizontal tweezer actuator 700 with slider 514 in a first position against mechanical stop 512a. FIG. 7b illustrates the horizontal tweezer actuator 702 with a lateral movement 704 of slider 514 along the length of tweezer assembly 516 to a second position between fixed end 502 and free end 504 of tweezer assembly 516. The movement causes free pincer 508 to flex towards fixed pincer 506 and compress reservoir 510. FIG. 7c illustrates the horizontal tweezer actuator 706 with a lateral movement 708 of slider 514 along the length of tweezer assembly 516 to a third position against mechanical stop 512b. The movement to the third slider position causes further compression of reservoir 510 to a maximal state of compression. In an embodiment, as slider 514 is moved away from free end 504 towards fixed end 502 laterally along the length of tweezer assembly 516, the compressing force on reservoir 510 is released, and reservoir 510 springs back to its original shape, temporarily causing low pressure on the fluid, and thus pulling fluid back from lens module 104.

FIG. 8 illustrates a perspective view of an embodiment of actuator arm 110. In this embodiment, a piston-driven actuator 800 includes a housing 812, a piston 802 disposed within housing 812, and a reservoir 804 disposed within housing 812 and with a distal end 806 attached to piston 802. The piston-driven actuator 800 further includes mechanical stops 808a and 808b, and a slider 810. In an embodiment, slider 810 fits around the outer surface of housing 812 and can slide laterally along the length of housing 812 between mechanical stops 808a and 808b.

In an embodiment, piston 802 is a magnet with a fixed polarity. In an embodiment, slider 810 is a magnet with a fixed polarity opposite the polarity of piston 802. Lateral movement of slider 810 along the length of housing 812 causes piston 802 to also move laterally within housing 812 due to magnetic forces between piston 802 and slider 810. Slider 810 may have any shape, such as that illustrated, for example, in FIG. 6a or FIG. 6b.

FIG. 9a illustrates a side view of the piston-drive actuator 900 with slider 810 in a first position against mechanical stop 808a. FIG. 9b illustrates the piston drive actuator 902 with a lateral movement 904 of slide' 810 along the length of housing 812 to a second position between mechanical stops 808a and 808b. Lateral movement 904 causes piston 802 to move laterally as well, thereby pushing distal end 806 of reservoir 804 closer to hinge 108 and collapsing reservoir 804. FIG. 9c illustrates the piston-drive actuator 906 with a lateral movement 908 of slider 810 along the length of housing 812 to a third position against mechanical stop 808b. Lateral movement 908 to the third slider position causes further collapsing of reservoir 804 to a maximal state. In an embodiment, as slider 810 is moved away from hinge 108 laterally along the length of housing 812, piston 802 is moved laterally away from hinge 108 as well. This causes reservoir 804 to spring back to its original shape, temporarily causing low pressure on the fluid, and thus pulling fluid back from lens module 104.

FIG. 10 illustrates an exploded perspective view of another embodiment of actuator arm 110. In this embodiment, a sandwich dome actuator 1000 includes a housing 1010 with an inner half 1002 and an outer half 1004, a plurality of meta-stable domes 1006 on inner half 1002 of housing 1010, and a plurality of bi-stable domes 1008 on outer half 1004 of housing 1010. A reservoir 1012 is disposed within housing 1010 and placed between meta-stable domes 1006 and bi-stable domes 1008. In an embodiment, each bi-stable dome 1008 is placed directly across from a respective meta-stable dome 1006. Compression of either bi-stable dome 1008 or a respective meta-stable dome 1006 causes compression on a portion of reservoir 1012 between the domes.

Plurality of bi-stable domes 1008 across from plurality of meta-stable domes 1006 along the outer surface of housing 1010 allow the wearer to carefully control the state of compression on reservoir 1012 disposed within housing 1010 and between the domes. Bi-stable domes 1008 allow for a local maximum compression while meta-stable domes 1006 allow for a local variable state of compression. Releasing the compression on reservoir 1012 by changing the states of the domes causes reservoir 1012 to spring back to its original shape, temporarily causing low pressure on the fluid, and thus pulling fluid back from lens module 104.

In an embodiment, either bi-stable domes 1008 or meta-stable domes 1006 are pressed in order starting with the domes located the furthest from hinge 108 and moving inward towards hinge 108 in order to control the amount of total compression on reservoir 1012. In an embodiment, compressing all of either bi-stable domes 1008 or meta-stable domes 1006 along the outside of housing 1010 causes a maximal state of compression on reservoir 1012.

FIG. 11 illustrates a cross-section of a single bi-stable dome 1100 across from a respective meta-stable dome 1102, further depicting the operation of bi-stable dome 1100. Bi-stable dome 1100 exists in either a relaxed state 1104 or a compressed state 1106. In relaxed state 1104, Bi-stable dome 1100 is pushed out away from reservoir 1012 in a direction perpendicular to the length of housing 1010. In compressed state 1106, Bi-stable dome 1100 is pushed inward towards reservoir 1012 in a direction perpendicular to the length of housing 1010. Compressed state 1106 causes a local maximum compression on the portion of reservoir 1012 between compressed bi-stable dome 1100 and respective meta-stable dome 1102. Applying a first force 1108 to the outer surface of bi-stable dome 1100 switches it from relaxed state 1104 to compressed state 1106. Applying a second force 1110 switches it from compressed state 1106 back to relaxed state 1104. Either force may be applied by any external means. For example, either force may be applied by the wearer's finger pressing on the bi-stable dome. First force 1108 and second force 1110 may be the same magnitude or different magnitudes. Each force must be larger than a given threshold magnitude in order to switch the bi-stable dome 1100 between either state.

FIG. 12a-d illustrate cross-sections of a single bi-stable dome 1200 across from a respective meta-stable dome 1202 further depicting the operation of meta-stable dome 1202. Meta-stable dome 1202 can exist in any state between a fully relaxed state 1204 and a fully compressed state 1206. Both fully relaxed state 1204 and fully compressed state 1206 are analogous to those of bi-stable dome 1100 as described previously. FIG. 12a illustrates meta-stable dome 1202 in fully relaxed state 1204. One or more forces may be applied to the surface of meta-stable dome 1202 to push it inward towards reservoir 1012. For example, FIG. 12b illustrates a first force 1208 pushing meta-stable dome 1202 from fully relaxed state 1204 to a first state 1210 causing a first compression upon reservoir 1012. FIG. 12c illustrates a second force 1212 pushing meta-stable dome 1202 to a second state 1214 causing a second compression upon reservoir 1012 greater than the first compression. FIG. 12d illustrates a third force 1216 pushing meta-stable dome 1202 to fully compressed state 1206 causing a local maximum compression on the portion of reservoir 1012 between bi-stable dome 1200 and meta-stable dome 1202. Meta-stable dome 1202 may be returned to fully relaxed state 1204 by pressing respective bi-stable dome 1200 into its compressed state thus pushing meta-stable dome 1202 back out away from reservoir 1012.

The above example is not intended to be limiting in its description of the operation. It can be appreciated that any number of forces of varying magnitude larger than a given threshold can be used to change the state of the meta-stable dome. The forces may be applied by any external means. For example, the forces may be applied by the wearer's finger pressing on the meta-stable dome.

The pieces of the various actuator assemblies described, for example, but not limited to, the tweezer assembly, housing, slider, ball bearings, meta-stable domes and bi-stable domes etc, may be manufactured through any suitable process, such as metal injection molding (MIM), cast, machining, plastic injection molding, and the like. The choice of materials may be further informed by the requirements of mechanical properties, temperature sensitivity, optical properties such as dispersion, moldability properties, or any other factor apparent to a person having ordinary skill in the art.

The fluid used in the fluid lens may be a colorless fluid, however, other embodiments include fluid that is tinted, depending on the application, such as if the intended application is for sunglasses. One example of fluid that may be used is manufactured by Dow Corning of Midland, Mich., under the name "diffusion pump oil," which is also generally referred to as "silicone oil."

The fluid lens may include a rigid optical lens made of glass, plastic, or any other suitable material. Other suitable materials include, for example and without limitation, Diethylglycol bisallyl carbonate (DEG-BAC), poly(methyl methacrylate) (PMMA), and a proprietary polyurea complex, trade name TRIVEX (PPG).

The fluid lens may include a membrane made of a flexible, transparent, water impermeable material, such as, for example and without limitation, one or more of clear and elastic polyolefins, polycycloaliphatics, polyethers, polyesters, polyimides and polyurethanes, for example, polyvinylidene chloride films, including commercially available films, such as those manufactured as MYLAR or SARAN. Other polymers suitable for use as membrane materials include, for example and without limitation, polysulfones, polyurethanes, polythiourethanes, polyethylene terephthalate, polymers of cycloolefins and aliphatic or alicyclic polyethers.

The connecting tube may be made of one or more materials such as TYGON (polyvinyl chloride), PVDF (Polyvinyledene fluoride), and natural rubber. For example, PVDF may be suitable based on its durability, permeability, and resistance to crimping.

The housing and tweezer assembly may be any suitable shape, and may be made of plastic, metal, or any other suitable material. In an embodiment, the housing and tweezer assembly are made of a lightweight material such as, for example and without limitation, high impact resistant plastics material, aluminum, titanium, or the like. In an embodiment, the housing and tweezer assembly may be made entirely or partly of a transparent material.

The reservoir may be made of, for example and without limitation, Polyvinyledene Difluoride, such as Heat-shrink VITON®, supplied by DuPont Performance Elastomers LLC of Wilmington, Del., DERAY-KYF 190 manufactured by DSG-CANUSA of Meckenheim, Germany (flexible), RW-175 manufactured by Tyco Electronics Corp. of Berwyn, Pa. (formerly Raychem Corp.) (semirigid), or any other suitable material. Additional embodiments of the reservoir are described in U.S. Pat. Pub. No. 2011/0102735 which is incorporated by reference in its entirety.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An actuator for a sealed fluid filled lens comprising:
   a tweezer assembly with a fixed end and a free end;
   a reservoir disposed within the tweezer assembly wherein the reservoir is in fluid communication with the fluid filled lens and is placed parallel to a length of the tweezer assembly between the fixed end and the free end such that flexing the tweezer assembly compresses the reservoir along a length of the reservoir; and
   a slider that is laterally moveable along an outer surface of the tweezer assembly, wherein movement of the slider from one end of the tweezer assembly to the other end flexes the tweezer assembly.

2. The actuator of 1, wherein the slider moves laterally along the length of the tweezer assembly.

3. The actuator of 1, wherein the flexing direction of the tweezer assembly is vertically aligned with respect to the length of the tweezer assembly.

4. The actuator of 3, wherein the slider has a rounded cuff shape.

5. The actuator of 3, wherein the slider moves along an inner side of the tweezer assembly.

6. The actuator of 1, wherein the flexing direction of the tweezer assembly is horizontally aligned with respect to the length of the tweezer assembly.

7. The actuator of 6, wherein the slider has an open bracket shape.

8. The actuator of 6, wherein the slider has a closed bracket shape.

9. The actuator of 7, wherein the slider further comprises a sliding loop connected to the slider, wherein the sliding loop fits around the tweezer assembly.

10. The actuator of 8, wherein the slider further comprises a sliding loop connected to the slider, wherein the sliding loop fits around the tweezer assembly.

11. The actuator of 1, wherein the slider glides on ball bearings placed between the slider and the tweezer assembly.

12. The actuator of 6, wherein the slider glides on ball bearings placed between the slider and the reservoir.

13. The actuator of 1, wherein movement of the slider along the tweezer assembly is confined between two mechanical stops.

14. The actuator of 1, wherein the fixed end of the tweezer assembly is distal to the fluid filled lens.

15. An actuator for a sealed fluid filled lens comprising:
    a housing;
    a reservoir disposed within the housing wherein the reservoir is in fluid communication with the fluid filled lens and is placed parallel to a length of the housing, the length being the longest dimension of the housing;
    a piston placed inside the housing and attached to a distal end of the reservoir wherein the piston is a magnet having a fixed polarity, and wherein lateral movement of the piston from a first end of the housing to a second end of the housing collapses the reservoir onto itself; and
    a slider which can move laterally along an outer surface of the housing and wherein the movement of the slider from the first end of the housing to the second end of the housing moves the piston causing the reservoir to collapse onto itself.

16. The actuator of 15, wherein the slider is a magnet having a fixed polarity that is opposite the polarity of the piston.

17. The actuator of 15, wherein the slider has an open bracket shape.

18. The actuator of 15, wherein the slider has a closed bracket shape.

19. The actuator of 15, wherein the slider glides on ball bearings placed between the slider and the housing.

20. The actuator of 15, wherein the lateral movement of the slider along the outer surface of the housing is confined between two mechanical stops.

21. An actuator for a sealed fluid filled lens comprising:
    a housing with an inner half and an outer half;
    a plurality of compressible domes placed along the outer surface of the housing comprising:
      a plurality of meta-stable domes placed along the outer surface of the inner half of the housing; and
      a plurality of bi-stable domes placed along the outer surface of the outer half of the housing
    wherein each bi-stable dome is placed directly across from a respective meta stable dome; and
    a reservoir disposed within the housing wherein the reservoir is in fluid communication with the fluid filled lens, and wherein the reservoir is placed between the plurality of meta-stable domes and the plurality of bi-stable domes.

22. The actuator of 21, wherein each bi-stable dome is compressible into the respective meta-stable dome.

23. The actuator of 22, wherein each bi-stable dome exists in either a compressed state or a relaxed state.

24. The actuator of 23, wherein the compressed state of the bi-stable dome causes a local maximal compression of the reservoir.

25. The actuator of 23, wherein the relaxed state causes no compression of the reservoir.

26. The actuator of 23, wherein compression of the bi-stable dome causes compression of the reservoir.

27. The actuator of 21, wherein each meta-stable dome is compressible into the respective bi-stable dome.

28. The actuator of 27, wherein each meta-stable dome can exist in any state between a fully compressed state and a fully relaxed state.

29. The actuator of 28, wherein the fully compressed state causes a local maximal compression of the reservoir.

30. The actuator of 28, wherein the fully relaxed state causes no compression of the reservoir.

31. The actuator of 21, wherein the compressible domes are spaced equidistant along a length of the housing, the length being the longest dimension of the housing.

32. The actuator of 21, wherein compression of any bi-stable dome will return the respective meta-stable dome from any state of compression to the fully relaxed state.

\* \* \* \* \*